Aug. 8, 1944.     C. E. TACK ET AL     2,355,123
ROTOR BRAKE
Filed Feb. 16, 1942     3 Sheets-Sheet 3
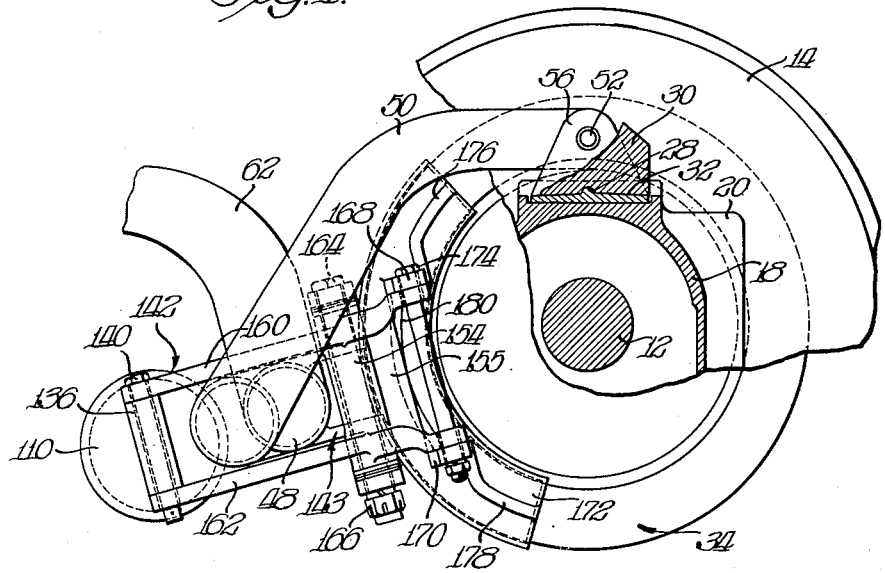
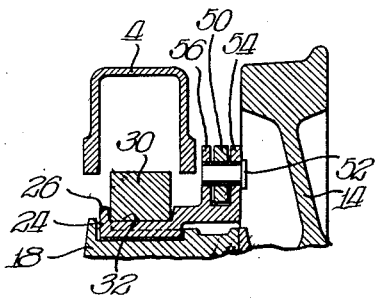
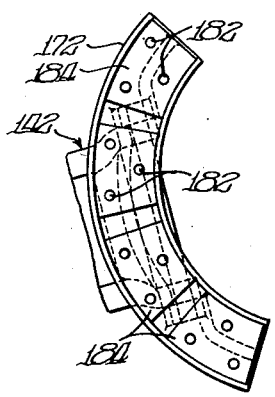
INVENTOR.
Carl E. Tack
Wesley H. Helsten
BY
ATTORNEY.

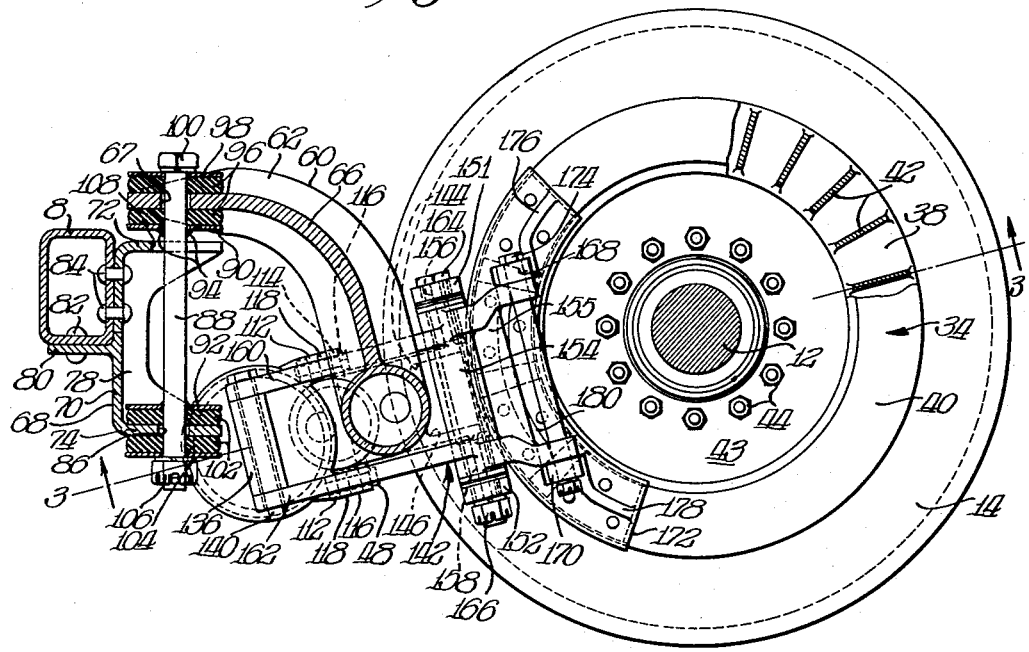

Patented Aug. 8, 1944

2,355,123

UNITED STATES PATENT OFFICE 2,355,123

ROTOR BRAKE

Carl E. Tack and Wesley A. Helsten, Chicago, Ill., assignors to American Steel Foundries, Chicago, Ill., a corporation of New Jersey Application February 16, 1942, Serial No. 431,068

8 Claims. (Cl. 188—205)

Our invention relates to a brake arrangement for a railway car truck and especially to a brake design commonly called "off wheel" wherein brake drums are supported to rotate with the wheel and axle assemblies and to afford braking surfaces independently of the tread surfaces of the wheels.

The general object of our invention is to devise an off wheel brake arrangement wherein braking discs are supported to rotate with each wheel and axle assembly, and a brake frame is carried by the truck frame and supports levers with brake shoes for frictional engagement at opposite sides of each brake disc.

Our invention comprehends the utilization of brake discs or rotors, each of which comprises three spaced parallel annular metal plates and a plurality of equidistantly spaced radially arranged blades extending between the central of said plates and the friction plates at opposite sides thereof, the central of said plates being connected at its inner perimeter to a bell-like support member secured to the associated wheel so that said rotor may operate as a double blower when rotating as more fully described in the co-pending application for United States Letters Patent, Serial No. 409,999 in the name of Carl E. Tack.

A specific object of our invention is to devise such a braking arrangement as that described wherein the brake frame member supported at each end of the truck may be supported adjacent journal boxes at opposite sides of the truck and may be afforded a further torque connection at an intermediate point of the truck, thus providing a three point frame support.

A different object of our invention is to provide a three point brake frame support such as that described, so mounted that the shoes carried thereon will be supported eccentrically with respect to the wheel and axle assembly on which the brake discs are mounted so that a washing action may be afforded said shoes against the adjacent discs, thus preventing the formation of concentric grooves in the brake surfaces of the discs as more fully described in the co-pending application for United States Letters Patent, Serial No. 421,418 in the name of Carl E. Tack.

A more specific object of our invention is to afford a three point brake frame for each wheel and axle assembly of a railway car truck wherein two of said support points consist of eccentric connections adjacent the journal boxes of the associated wheel and axle assembly and the third support point consists of a resilient connection to a portion of the frame which may be resiliently supported in the usual manner on said journal boxes for vertical movement with respect thereto as is customary in railway car trucks.

A different object of our invention is to provide a novel form of truck connection between a brake frame such as that described and an adjacent portion of the truck, said connection comprising a torque arm integrally formed with said frame, an adjacent bracket secured to said truck, and a pin connected to said arm and to said bracket, said connections being resilient in order to afford resilient control of vertical and lateral movements of the brake frame with respect to said truck frame.

Our invention comprehends a connection between a brake frame and a truck frame such as above described in which the connecting pin is movable with respect to the associated bracket at the end connected to the torque arm on the brake frame in order that relative movement between the wheel and axle assembly and the truck frame may be accommodated by the connection between the brake frame and the truck frame.

Still another specific object of our invention is to devise a novel form of a combined equalizer seat and brake frame support casting which may seat upon each journal box and afford support for one end of an adjacent equalizer and an adjacent connection for one end of the associated brake frame.

Our invention also comprehends such an arrangement of the brake frame and the associated levers and other brake parts as will facilitate the removal or change of the associated wheel and axle assemblies, while said brake frame and associated parts remain in normal assembled relationship.

Still another object of our invention is to devise such a brake frame as that described wherein the power means for actuation of the brake levers associated with the brake frame may be adjustably mounted on the frame in such a manner as to accommodate cylinders of varying sizes and brake levers of varying lengths.

Still another object of our invention is to devise a brake arrangement such as that above described in which the brake levers are supported from the brake frame in a diagonal plane in order to permit the use of relatively large brake shoes as compared with the shoes utilized in similar designs, and at the same time to afford clearance from the underframe of the associated car.

A further object of our invention is to devise novel actuating means for said brake levers comprising push rods pivotally connected thereto and to oppositely acting pistons in the associated double acting cylinders mounted on the brake frame.

A further object of our invention is to design a novel support for each cylinder utilized in our arrangement at one side of the associated brake frame, said frame being offset from the ends thereof at the point of support in order to afford clearance for said cylinder from the truck frame.

In the drawings,

Figure 2 is a sectional view in the vertical plane bisecting the truck longitudinally as indicated by the line 2—2 of Figure 1, a portion of the rotor, shown in said view, being broken away in order more clearly to illustrate the design thereof.

Figure 3 is a sectional view in the diagonal plane indicated by the line 3—3 of Figure 2.

Figure 4 is a further sectional view in the vertical planes indicated by the line 4—4 of Figure 1, the wheel, the journal box, and the equalizer, shown in said view, being partially broken away in order more clearly to show the braking means therebehind, and Figure 5 is a further fragmentary sectional view in the vertical plane indicated by the line 5—5 of Figure 1.

Figure 6 is a fragmentary sectional view taken in the vertical plane indicated by the line 6—6 of Figure 1 and showing one of the brake heads and the friction means secured thereto.

Figure 1:
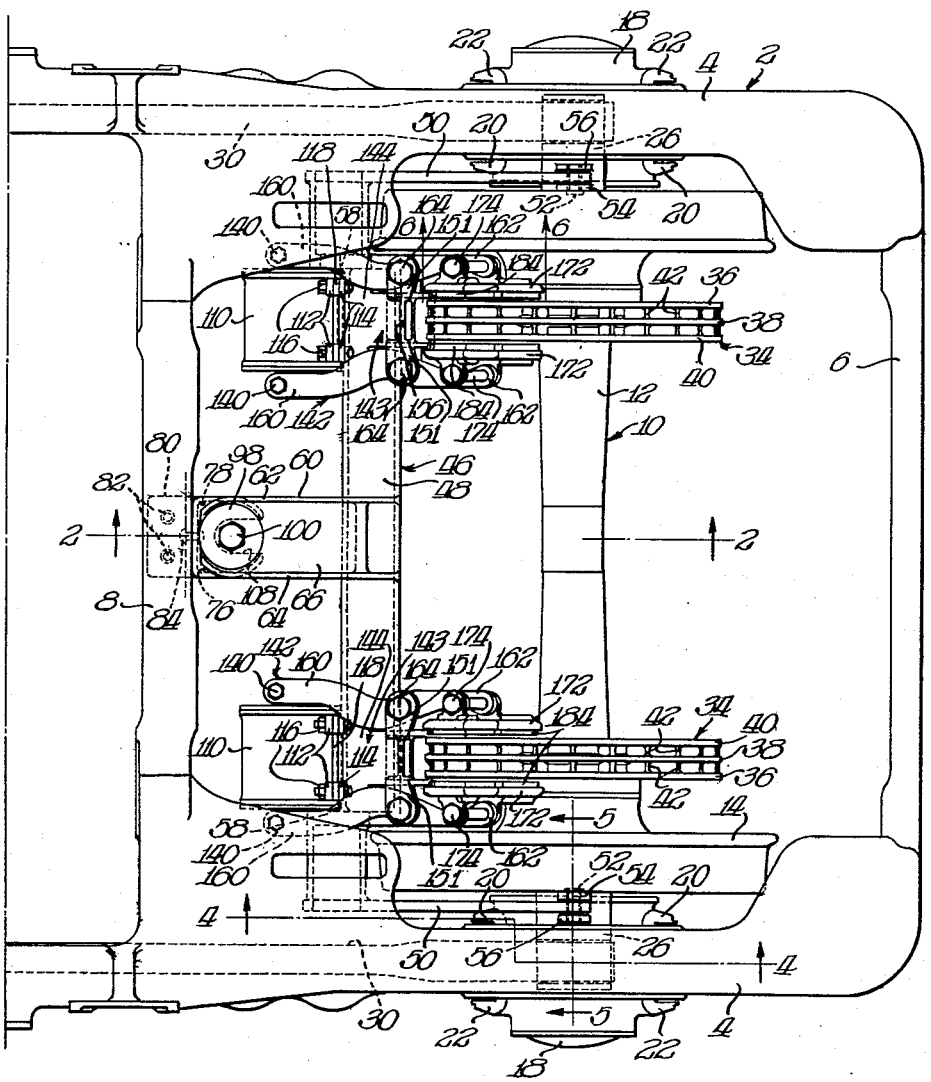
Figure 1 is a fragmentary top plan view of a railway car truck embodying our novel brake arrangement, only one end of the truck being shown inasmuch as it is similar at opposite ends thereof.

Describing our novel arrangement in detail, the truck frame generally designated 2 comprises the side rails 4, 4, the end rails 6, 6 and the transoms 8, 8 adjacent opposite ends of the truck. The truck is supported at each end thereof by a wheel and axle assembly generally designated 10 and comprising the axle 12 with a wheel 14 press fitted on each end thereof as at 16 (Figure 3). A journal box 18 accommodates each end of the axle 12 in usual manner and comprises the inboard and outboard pedestal jaws 20 and 22 engaged in usual manner with the pedestal legs (not shown) on each side rail 4 adjacent each end thereof, said journal box comprising a recess 24 in the top thereof for reception of the equalizer seat 26, said seat comprising the arcuate lug 28 (Figure 4) affording positioning means for the equalizer 30 seated thereon as at 32, said equalizer affording a seat in usual manner for springs (not shown), said springs supporting the truck frame 2 as will be clearly apparent to those skilled in the art. The equalizer seat 26 also affords connection for the associated torque arm on our novel brake frame as hereinafter more fully described.

Our novel braking means associated with each wheel and axle assembly 10 comprises a rotor generally designated 34, said rotor comprising three spaced plates of annular form designated respectively 36, 38 and 40, said plates being joined by the equidistantly arranged blades 42, 42. The blades between the plates 36 and 38 and the blades between the plates 38 and 40 are aligned transversely of the rotor to form a column therethrough resisting pressure applied thereto by the associated brake means as hereinafter more fully described. The central blade 38 is thickened as at 41 (Figure 3) at the inner perimeter thereof for engagement with the bell shaped supporting member 43, said member being secured to the associated wheel 14 by the spaced stud bolts 44, 44. It will be clearly apparent to those skilled in the art that the rotor 34 when rotating with the associated wheel 14 acts as a double blower to throw outwardly the air between the blades 42, 42 and to draw cooling air between said blades from opposite sides of the rotor as indicated by the arrows X and Y (Figure 3) and as more fully described in the said co-pending application, Serial No. 409,999.

The brake frame generally designated 46 supports the friction means associated with each rotor as well as the actuating means therefor in the manner hereinafter more fully described, and said frame comprises a transverse tube 48 comprising a torque arm 50 integrally formed at each end thereof, said arm being pivotally connected at 52 to the inboard and outboard vertical flanges 54 and 56 on the associated equalizer seat 26. The torque tube 48 is offset centrally thereof as at 58 for a purpose hereinafter described and comprises intermediate the ends thereof the integral torque arm 60, said arm comprising the spaced webs 62 and 64 joined by the web 66 comprising the opening 67 therethrough as best seen in Figure 2. The torque arm 60 is connected to the truck frame 2 through the transom 8 as hereinafter more fully described. The bracket 68 adjacent said arm comprises the vertical web 70, top and bottom webs 72 and 74, the side webs 76 and 78, and the horizontal flange 80, said flange underlying the transom 8 as best seen in Figure 2 and being secured thereto by rivets 82, 82. The vertical web 70 of said bracket is secured by rivets 84, 84 to said transom, and the bottom web 74 comprises an opening 86 therethrough for the reception of the bolt 88 having the top and bottom plates 90 and 92 welded thereto as at 94, 94. The web 66 of the torque arm is clamped by the annular rubber pads 96, 96 sleeved over the bolt 88 and positioned respectively by the upper plate 90 and the washer 98, said washer being secured by the head 100 of the bolt 88. The bottom web 74 of the bracket 68 is clamped between annular rubber pads 102, 102 sleeved over the bolt 88 and positioned respectively by the bottom plate 92 and the washer 104, said washer being secured by the nut 106, threaded on the lower end of the bolt 88.

It may be noted that the top web 72 of the bracket 68 is slotted as at 108 to permit the bolt 88 to move with respect thereto and thus accommodate relative movement between the truck frame 2 and the associated wheel and axle assembly 10. Adjacent each end thereof the tube 48 supports in a manner hereinafter more fully described a cylinder generally designated 110. It will be recognized that the offsetting of the tube 48 at 58 will afford clearance from the associated transom 8 for the cylinder 110 as the brake frame moves longitudinally with respect to the truck frame. The support for the cylinder 110 comprises spaced lugs 112, 112 thereon and the oppositely spaced lugs 114, 114 on the tube 48. Each lug 112, 112 is secured to the corresponding lug 114 by a bolt and nut assembly 116. A filler bar 118 is inserted between the lugs 112, 112 and the lugs 114, 114 in order to make the connection therebetween adjustable. It will be readily apparent to those skilled in the art that by elimination of the filler bar 118 a somewhat larger cylinder may be accommodated for the brake arrangement and by substitution of a larger filler bar the cylinder 110 may be adjusted to accommodate longer brake levers, as desired.

Within each cylinder 110 are the oppositely acting pistons 120, 120 and, as best seen in Figure 3, a sleeve 122 is secured as at 124 to each piston 120. At each end of the cylinder is a cover plate 126 secured thereto in any convenient manner and affording a seat as at 128 for one end of the release spring 130, said spring being seated at its opposite end as at 132 against the associated piston 120. Each sleeve 122 extends outwardly through the associated spring 130 and through the associated cover plate 126 and is provided with a cap 134 abutting the cover plate 126 in released position. A push rod 136 is pivotally connected at 138 to each sleeve 122 and extends outwardly therefrom for pivotal connection as at 140 to the associated end of the double cylinder lever generally designated 142. Each lever 142 is afforded support from the associated torque tube 48 by a support member generally designated 143 (Figure 1), and said member comprises top and bottom webs 144 and 146 and inboard and outboard side webs 148 and 150 as best seen in Figure 3, all of the webs 144, 146, 148 and 150 being integral with the torque tube 48, the top and bottom webs 144 and 146 being flanged as at 151 and 152 respectively at each side thereof to form a jaw for the reception of the tube portion 154 of the associated double lever 142 hereinafter more fully described. The flanges 151, 151 at opposite sides of the top web are reinforced by the web 156 and the flanges 152, 152 on the bottom web are reinforced by the web 158.

Each lever 142 comprises the top and bottom arms 160 and 162 as best seen in Figures 2 and 4, connected intermediate the ends thereof by the tube portion 154 reinforced by the web 155 and received within the associated jaw on the support member 143 and pivotally connected therewithin by the pin 164 secured by the nut 166, and said arms 160 and 162 are connected respectively to lugs 168 and 170 formed on the associated brake head 172, said arms being pivotally secured by the pin 174.

It may be noted that the lugs 168 and 170 on each brake head 172 are reinforced by the end ribs 176 and 178 and by the intermediate rib 180 on the brake head as best seen in Figures 2 and 3. Each brake head 172 is of U-section as best seen in Figures 3 and 6 and has secured thereto as at 182, 182 the spaced segments 184, 184 of composition braking material formed and arranged for frictional engagement with the associated plate 36 or 40 of the adjacent rotor.

In operation, the pistons 120, 120 in each cylinder 110 are forced outwardly from each other and by means of the rods 136, 136 push apart the adjacent ends of the associated brake levers 142, 142, thus causing the associated rotor 34 to be squeezed between the brake heads 172, 172 and to be braked by the composition braking material 184, 184 secured to said heads. After actuation of the brake mechanism, the springs 130, 130 return the pistons 120, 120 to their normal inoperative position. During actuation of the brakes, torque is transmitted to the journal boxes and thence to the associated wheel and axle assembly by the torque arms 50, 50 and torque is also transmitted to the truck frame by the torque arm 60, said arm being afforded movement with respect to the truck frame as said frame and the associated assembly move with respect to each other.

It is to be understood that we do not wish to be limited by the exact embodiment of the device shown which is merely by way of illustration and not limitation as various and other forms of the device will, of course, be apparent to those skilled in the art without departing from the spirit of the invention or the scope of the claims.

We claim:

1. In a brake arrangement, a vehicle frame, a supporting wheel and axle assembly, rotors supported from said assembly, friction means formed and arranged for engagement with said rotors, actuating means associated with said friction means, and a support from said frame for said actuating means, said support comprising a frame member supported from said assembly and supporting said actuating means, a bracket comprising spaced horizontal webs secured to said vehicle frame, said top web comprising a slot, a pin resiliently connected to said bottom web extending upwardly through said slot and resiliently connected to said frame member, said slot permitting movement of said pin as said assembly and said vehicle move with respect to each other.

2. In a brake arrangement for a railway car truck comprising a truck frame and a supporting wheel and axle assembly including an axle and a member rotatable therewith, friction means for engagement with said member, and a brake frame extending transversely of said truck and affording support for said friction means, said brake frame being supported at its extremities from said truck, a torque connection between said brake and truck frames, said connection comprising a bracket on the truck frame, a rigid member resiliently connected at one end thereof to said bracket, rigid means on said bracket limiting longitudinal and transverse movement of said rigid member, and a resilient connection between the opposite end of said member and said brake frame.

3. In a brake arrangement for a railway car truck comprising a truck frame and a supporting wheel and axle assembly including an axle and a member rotatable therewith, friction means for engagement with said member, and a brake frame extending transversely of said truck and affording support for said friction means, said brake frame being supported at its extremities from said truck, a torque connection between said brake and truck frames, said connection comprising a bracket having spaced top and bottom webs secured to said truck frame, said top web comprising a slot, a rigid member resiliently connected to said bottom web, extending upwardly through said slot, and resiliently connected to said brake frame, said slot permitting movement of said rigid member as said assembly and said truck frame move with respect to each other.

4. In a brake arrangement for a railway car truck comprising a truck frame and a supporting wheel and axle assembly including an axle and a member rotatable therewith, friction means for engagement with said member, and a brake frame extending transversely of said truck and affording support for said friction means, said brake frame being supported at its extremities from said truck, a torque connection between said brake and truck frames, said connection comprising a bracket on said truck frame having vertically spaced webs, one of said webs comprising a slot, and a rigid member resiliently connected to the other web, extending through said slot and resiliently connected to said brake frame, said slot permitting movement of said rigid member as said assembly and said truck frame move with respect to each other.

5. In a brake arrangement for a railway car truck, a truck frame, a supporting wheel and axle assembly, journal means associated with the ends thereof, a brake frame disposed beneath the axle level, said brake frame having arms at opposite ends thereof pivotally connected to said journal means eccentrically with respect to said assembly, a torque connection between said brake and truck frames, bifurcated levers fulcrumed on said brake frame and each having spaced arms extending above and below said brake frame, a power cylinder on said brake frame operatively associated with said levers, friction means supported from respective levers, and a rotor driven by said assembly between the friction means associated with respective levers, said levers being diagonally disposed with respect to the horizontal.

6. In a brake arrangement for a railway car truck, a truck frame, a supporting wheel and axle assembly, a brake rotor driven thereby, friction means for engagement with said rotor, and a brake frame affording support for said means, said brake frame being supported from said assembly and being afforded a resilient connection to said truck frame, said connection comprising a bracket on the truck frame, a rigid member resiliently connected at one end thereof to said bracket, rigid means on said bracket limiting longitudinal and transverse movement of said member, and a resilient connection between the opposite end of said member and said brake frame.

7. In a brake arrangement, a vehicle frame, a supporting wheel and axle assembly, a rotor driven thereby, friction means for engagement with said rotor, actuating means associated with said friction means, and a support from said frame for said actuating means, said support comprising a frame member supported from said assembly, a bracket comprising spaced top and bottom webs secured to said vehicle frame, said top web comprising a slot, a rigid member resiliently connected to said bottom web, extending upwardly through said slot, and resiliently connected to said frame member, said slot permitting movement of said rigid member as said assembly and said vehicle move with respect to each other.

8. In a brake arrangement, a vehicle frame, a supporting wheel and axle assembly, a rotor driven thereby, friction means for engagement with said rotor, actuating means associated with said friction means, and a support from said frame for said actuating means, said support comprising a brake frame supported from said assembly, a bracket on said vehicle frame comprising vertically spaced webs, one of said webs comprising a slot, a rigid member resiliently connected to the other web, extending through said slot, and resiliently connected to said brake frame, said slot permitting movement of said rigid member as said assembly and said vehicle move with respect to each other.

CARL E. TACK.
WESLEY A. HELSTEN.